(12) United States Patent  (10) Patent No.: US 7,578,326 B2
Preusker  (45) Date of Patent: Aug. 25, 2009

(54) ANTI-SKID DEVICE FOR VEHICLE WHEELS

(75) Inventor: Werner Preusker, Sauldorf (DE)

(73) Assignee: Confon AG, Rheineck (CH)

( * ) Notice: Subject to any disclaimer, the term of this patent is extended or adjusted under 35 U.S.C. 154(b) by 32 days.

(21) Appl. No.: 11/574,461

(22) PCT Filed: Sep. 1, 2005

(86) PCT No.: PCT/CH2005/000514

§ 371 (c)(1),
(2), (4) Date: Feb. 28, 2007

(87) PCT Pub. No.: WO2006/032155

PCT Pub. Date: Mar. 30, 2006

(65) Prior Publication Data

US 2008/0190533 A1 Aug. 14, 2008

(30) Foreign Application Priority Data

Sep. 21, 2004 (CH) .................................... 1545/04

(51) Int. Cl.
B60C 27/20 (2006.01)
(52) U.S. Cl. ..................... 152/239; 152/223; 152/243
(58) Field of Classification Search ................ 152/217, 152/218, 223, 225 R, 231, 239, 241, 242
See application file for complete search history.

(56) References Cited

U.S. PATENT DOCUMENTS

| 1,368,175 | A | * | 2/1921 | McFee | 59/85 |
| 3,095,919 | A | * | 7/1963 | Yohe | 152/236 |
| 4,388,754 | A | * | 6/1983 | Ilon | 29/446 |
| 4,799,522 | A | * | 1/1989 | Ilon | 152/213 R |
| 4,922,982 | A | * | 5/1990 | Metraux | 152/216 |
| 5,012,848 | A | * | 5/1991 | Metraux | 152/218 |
| 5,033,522 | A | * | 7/1991 | Metraux | 152/213 A |
| 5,254,187 | A | * | 10/1993 | Metraux | 152/216 |
| 7,036,542 | B2 | * | 5/2006 | Kaiser et al. | 152/218 |

FOREIGN PATENT DOCUMENTS

| DE | 7732129 | U1 | * | 2/1978 |
| EP | 376427 | A | * | 7/1990 |
| EP | 376428 | A | * | 7/1990 |
| EP | 460782 | A | * | 12/1991 |
| EP | 0911193 | | | 4/1999 |

* cited by examiner

Primary Examiner—S. Joseph Morano
Assistant Examiner—Kip T Kotter
(74) Attorney, Agent, or Firm—Volpe and Koenig, P.C.

(57) ABSTRACT

An anti-skid device for vehicle tires is provided which includes a chain cover formed by two spaced apart chain lengths (9) formed of links (11), that are connected by connector links (15). Guide chain bodies (23) engage the connector links (15), which connect the chain cover to retainer loops (29) arranged in a star-shaped pattern on the vehicle wheel. The connection between the retainer loops (29) and the chain cover is achieved by a single guide chain body (23) and results in a uniform usage of all elements over the entire circumference. The chain cover can be turned over by undoing the guide chain bodies (23).

4 Claims, 3 Drawing Sheets

ANTI-SKID DEVICE FOR VEHICLE WHEELS

BACKGROUND

The invention relates to an anti-skid device for vehicle tires. Anti-skid devices for vehicle tires serve, on the one hand, as snow-chains in winter and, on the other hand, the tires of work vehicles can be provided with chains in order, for example, to protect the tires from early destruction by sharp-edged stones when operating in quarries. The present invention particularly relates to anti-skid devices for the use on snow and/or ice. The anti-skid device in question here relates to such a device, having bars arranged in a star-shaped manner to a retainer loop, which is held to the rim of the vehicle tire in a rotary manner.

Anti-skid devices of the above-mentioned type are known. For example, in EP-B1 0 911 193 an anti-skid device for vehicle tires is described having a holding device that can be mounted to the vehicle wheel and is rotational in reference thereto in the mounted state. FIG. 4 is a copy of FIG. 1 from this reference and shows the anti-skid device of EP-B1 0 911 193. In this known anti-skid device, comprising a rotary support loop or part 101 connected to the rim 102, a ladder-type chain cover supported on the tire tread of the tire 103 is held by extension arms or retainer boys 104 that extend in a spoke or star-shaved pattern from the rotary support boy or part 101, and the retainer loops 105 are only connected to the chain length 106 facing the exterior of the vehicle wheel and not inner chain length 107. For this purpose, means are provided pivotally at the ends of the retainer loops and to a certain extent vertically displaceable, at their front edge in a slot-shaped recess with chain links of the exterior chain length being mounted in a fixed manner via a bolt. Additionally, connector elements 108. 109 are provided, and some of the connector elements 108 connecting the two chain lengths are guided in a slot at the retainer loops 105 such that the latter always extends parallel to the retainer loop and thus fastens the two chain lengths in the travel direction of the tire. This known anti-skid device has the disadvantage that, on the one hand, in the area of the exterior length 106, a head piece must be mounted to the retainer loop, which wraps the chain links from both sides and thus has a radially greater dimension in reference to the chain lengths, which has negative effects during driving. Additionally this head piece impinges the road at each rotation and thus is subject to strong usage. The chain links mounted in the head piece are held by a separate bolt, which in turn must be fixed and/or secured in the head piece. These elements, are also subject to strong usage when impinging the road and thus present a risk for driving safety.

SUMMARY

The object of the present invention is to provide an anti-skid device of the above-mentioned type which avoids the known disadvantages and is very simple with a production cost effective design and less subject to wear.

This object is attained in an anti-skid device according to the features of the invention. Particularly advantageous embodiments are described in the dependent claims.

Surprisingly the objective is achieved, by a freely mobile connection between a connector link, connecting the two chain lengths and the free end of the retainer loop to position and guide the chain cover precisely on the tire tread without radially enlarging the diameter of the anti-skid device.

BRIEF DESCRIPTION OF THE DRAWINGS

Using the illustrated exemplary embodiment the invention is explained in greater detail. Shown are.

DETAILED DESCRIPTION OF THE PREFERRED EMBODIMENTS

Figure 1:
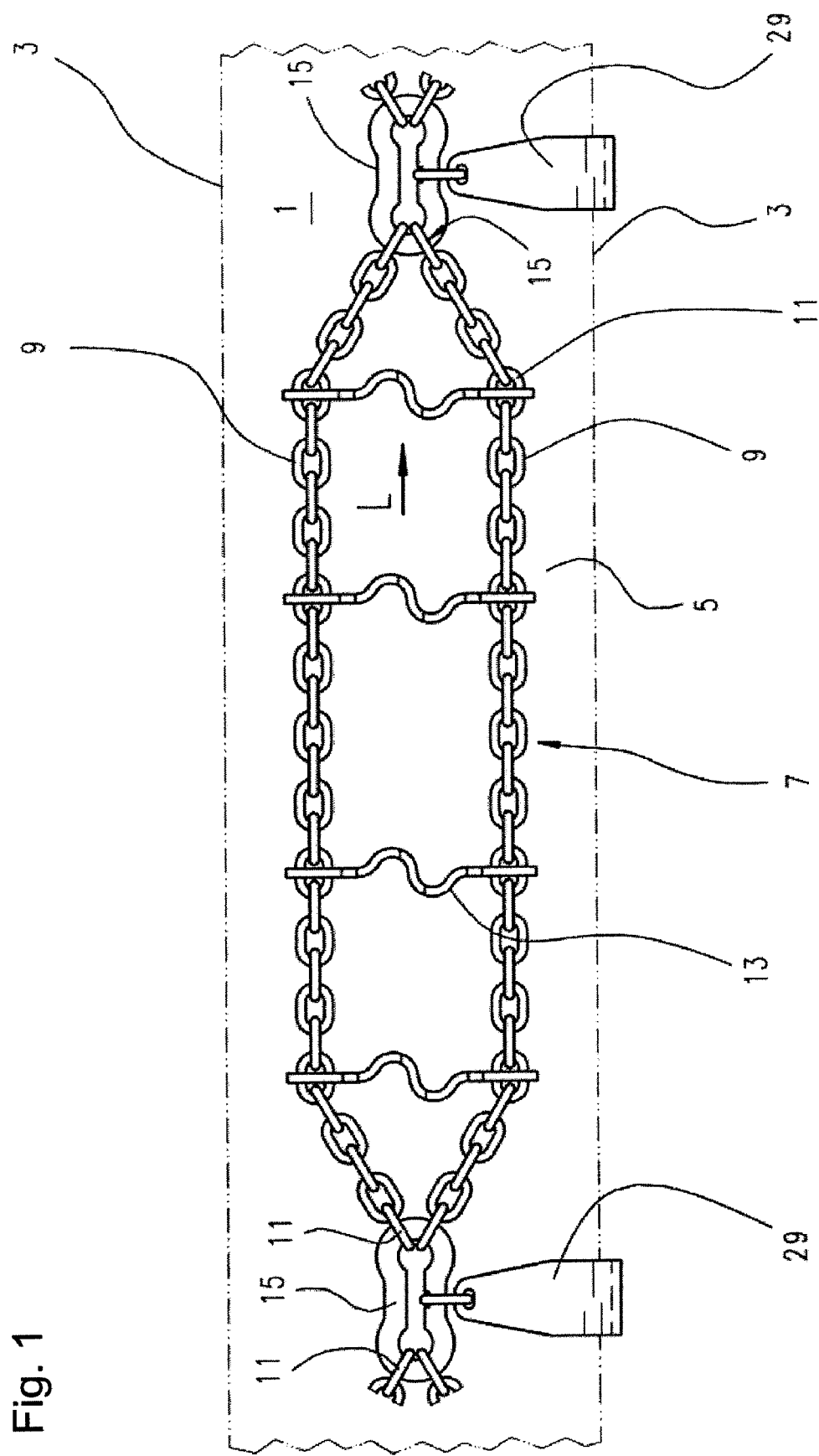
FIG. 1 a top view of an anti-skid device supported on a vehicle tire.

In FIG. 1, a tire 1 with its two sides 3 is schematically indicated in dot-dash lines. On the tread 5 of the tire 1, an anti-skid device 7 is supported, comprising two sectionally parallel extending chain lengths 9 made from interconnected chain links 11. The chain lengths 9 are held at a mutual distance by spacer elements 13.

Figure 2:
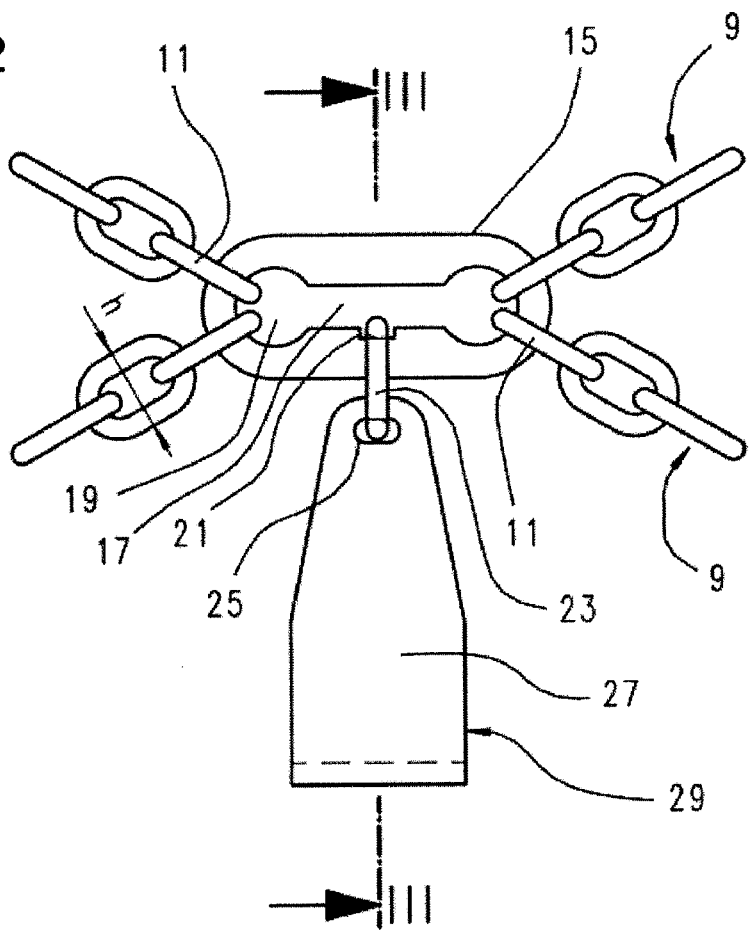
FIG. 2 an enlarged view of the connection between the retainer loop and the chain cover, and FIG. 3 a cross-sectional view along a line III-III in FIG. 2 through the connection.
Figure 3:
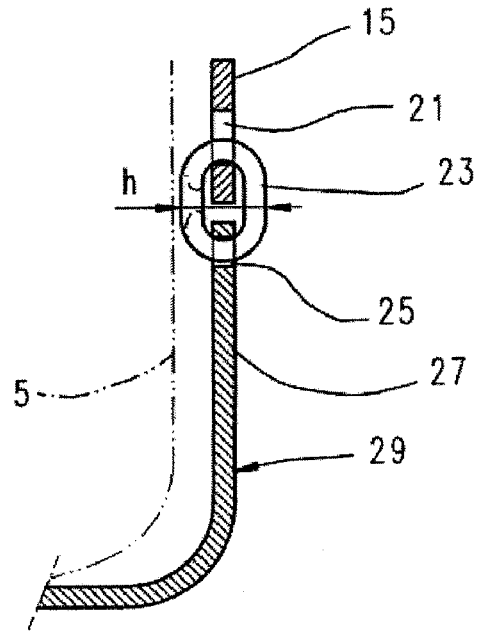
Figure 4:
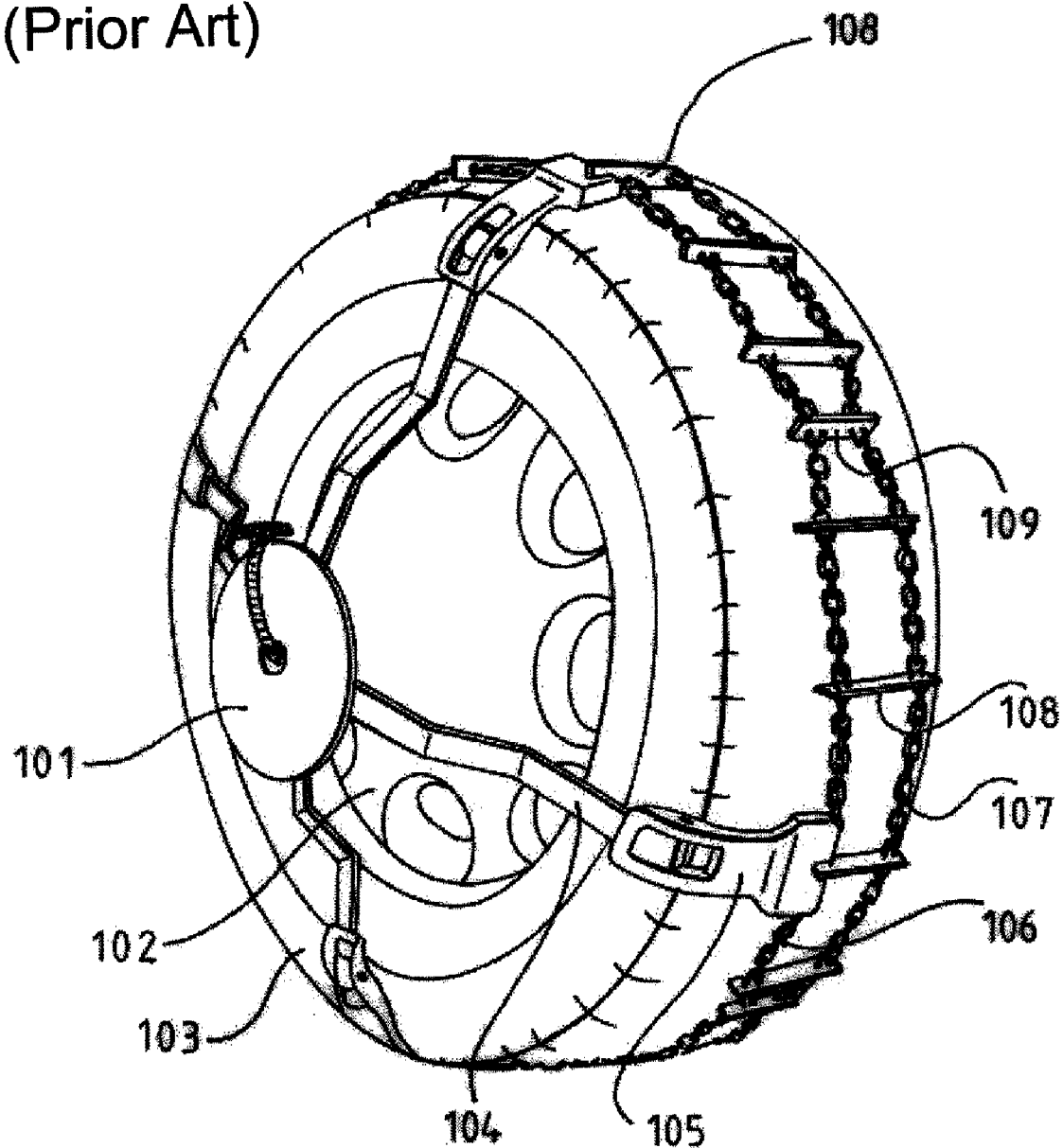
FIG. 4 a perspective view of the prior art arrangement of EP 0 911 193, over which the present anti-skid device is an improvement.

In regular intervals, for example after four spacers each, the two chain lengths 9 are guided together by a connector link 15, in a generally cross-shaped manner as shown FIG. 2. The connector link 15 has a longitudinal recess 17 that is provided at each of its lateral ends with a preferably round bore 19, and in its center between the bores 19 with an expanded section 21. The last chain links 11 each of the two chain lengths 9 are held in the two bores 19. A guide chain body 23 engages in the section 21, which is also connected to a hole 25 at the free end 27 of a retaining loop 29 (see particularly FIG. 2). The guide chain body 23 is located approximately perpendicular to the travel direction L of the tire. The height h of the guide chain body, which is supported with one of its sides on the tread 5 of the tire 1, is essentially identical to a height h of the chain links 11 of the chain lengths 9, which also engage the connector link 15. In FIG. 3, the chain links 11 connected to the connector link 15 and extending away from the connector link 15 are not shown for better visibility.

The retainer loop 29 is connected in a known manner with its end located opposite to the free end 27, not shown, to the support loop mounted to the wheel in a rotary manner.

Between the retainer loop 29 and the chain cover formed by the two chain lengths 9 and the spacer elements 13, a linked connection develops by the guide chain body 23. Due to the fact that the connector link 15 connects each of the two chain lengths 9 the chain cover is guided in a precise manner, in spite of its linked connection to the retainer loop 29. This means that the two chain lengths 9 cannot be displaced in reference to each other in the traveling direction L. The connection of the retainer loop 29 to the two chain lengths 9 also results in that only small forces are transferred from the chain cover to the retainer loop 29. Furthermore, by the even height h both of the guide chain body 23 and the chain links 11 of the chain cover over the tire tread 5 it is ensured that an even support of the chain cover and the guide chain body 23 on the road occurs even at the connection site of the retainer loop 29 to the chain cover. The usage of all chain links 11, 15 is therefore always even. In FIG. 3, the solid lines used show the guide chain body 23 indicate a closed link. When an open link guide chain body 23 is used, as indicated in the interrupted lines in FIG. 3, the chain cover can be separated from the retainer loops and flipped over as soon as an appropriate wear has occurred.

The invention claimed is:

1. An anti-skid device for vehicle tires, comprising a chain cover with two circularly extending chain lengths (9) located on the tire tread (5) essentially in a circumferential direction (L) of the tire and wrapping around at least a portion thereof, held at a mutual distance from one another by spacer elements (13), as well as retainer loops (29) mounted in a star-shaped pattern to a rotary support part, the free ends (27) of the retainer loops (29) are connected in a linked manner to guide chain bodies (23) located on the tire tread which are connected to connector links (15), which draw together and connect ends of the two chain lengths (9), the connector links (15) comprise a plate with two bores (19) spaced apart at a distance from one another, in which end chain links (11) of each of the two chain lengths (9) are held, and the guide chain bodies (23) are held in a recess (17) in the plate and a hole (25) at the end (27) of the retainer loop (29).

2. An anti-skid device according to claim 1, wherein the guide chain body (23) is a closed link.

3. An anti-skid device according to claim 1, wherein a height (h) of the guide chain bodies (23) is equivalent to a height (h) of the chain links (11) of the chain lengths (9).

4. An anti-skid device according to claim 1, wherein the guide chain body (23) is an open link.

* * * * *